No. 646,069. Patented Mar. 27, 1900.
F. X. GOLATA.
HAND POWER MOTOCYCLE.
(Application filed July 28, 1899.)
(No Model.)
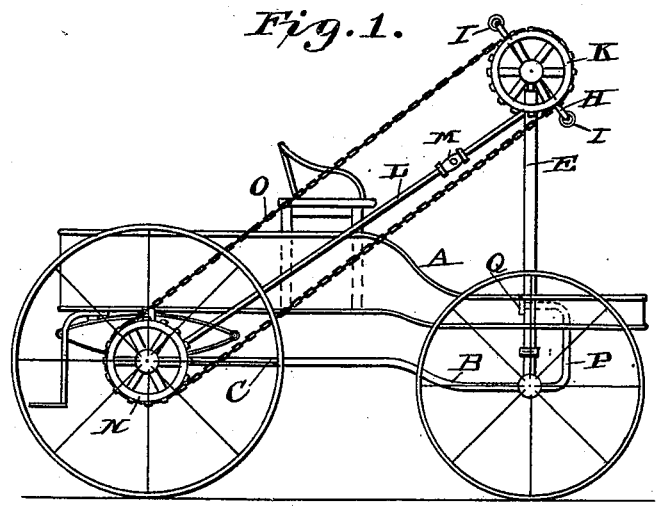
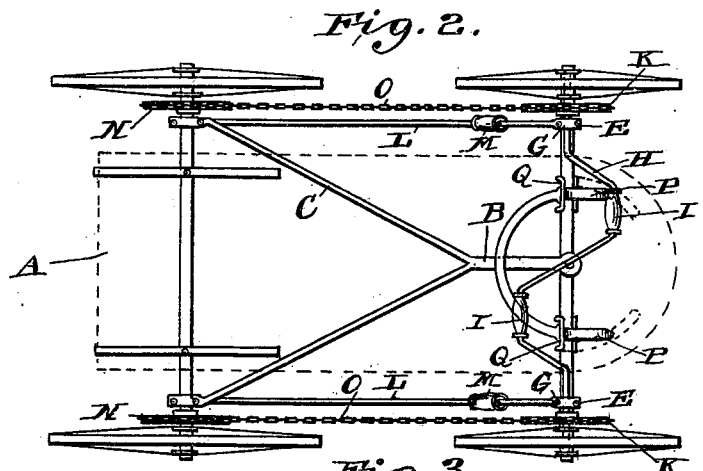
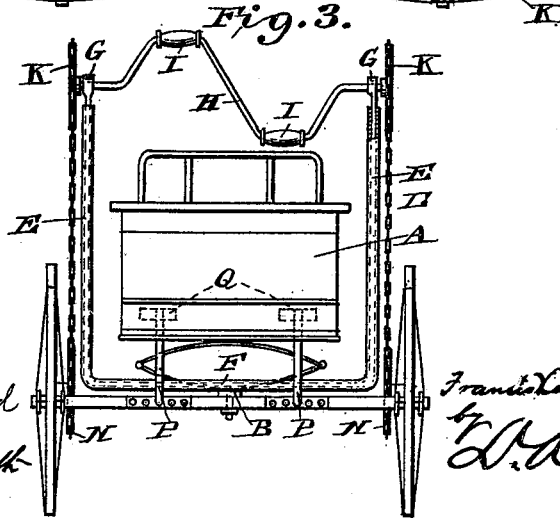

UNITED STATES PATENT OFFICE.

FRANCIS XAVIER GOLATA, OF DUNKIRK, NEW YORK.

HAND-POWER MOTOCYCLE.

SPECIFICATION forming part of Letters Patent No. 646,069, dated March 27, 1900.

Application filed July 28, 1899. Serial No. 725,434. (No model.)

*To all whom it may concern:*

Be it known that I, FRANCIS XAVIER GOLATA, a citizen of the United States, residing at Dunkirk, in the county of Chautauqua and State of New York, have invented certain new and useful Improvements in Hand-Power Motocycles, of which the following is a specification.

My invention relates to improvements in hand-power motocycles, and has for one of its objects to provide a simple, but strong, device that may be applied to any four-wheeled vehicle, so that it may be propelled by the hands of those riding in it.

Another of its objects is to provide means for increasing the power exerted in propelling a vehicle supplied with my invention.

Another of its objects is to provide means for using chain-and-sprocket gears in a hand-driven four-wheeled vehicle.

Another of its objects is to provide means for steering the vehicle with the feet while the hands are engaged in propelling the vehicle.

These objects I accomplish in the manner and by the means hereinafter more fully described in detail, and particularly pointed out in the claim, reference being had to the accompanying drawings, in which the same reference-letters indicate like parts in all the figures.

Figure 1 is a side elevation of my invention. Fig. 2 is a top plan view of the same. Fig. 3 is a front elevation of the same.

My invention consists of a four-wheeled wagon A, having a front and rear axle connected by a reach B, in which the hind hounds C C join to form the reach B. The reach B is fastened to the front axle by a king-bolt and fifth-wheel. The body of the wagon is the ordinary rectangular body resting on ordinary elliptic or carriage springs and has the ordinary seats and is entered by a step from behind. Two standards E E, of suitable material, preferably steel tubing, and of suitable length, rising vertically from the front axle of the wagon A, one on each side outside the box or body of the wagon A, are supported by a cross-bar F, of suitable material, preferably steel tubing, passing above said front axle and the fifth-wheel of the wagon A, disconnected therewith and firmly and rigidly secured to the bottom of the front spring of the wagon. To the tops of said standards E E are fixed journal-boxes G G, in which is mounted a handle-bar H, of suitable material, preferably steel tubing, having two equidistant crank-handles I I, formed on opposite sides of it between said standards E E, so that said handles I I will be at a convenient height and distance to be grasped and turned by the hands of a person sitting in the wagon A. On each end of said handle-bar H outside said journal-boxes G G is placed a sprocket-wheel K. Near the top of each of said standards E E a brace L, of suitable material, preferably steel tubing, made in two parts, joined by a sleeve M, by means of which they can be tightened, is secured, said brace L extending back parallel to the body of the wagon A to its rear axle, to which it is rigidly secured. On the inner end of the hub of each of the rear wheels of the wagon A a sprocket-wheel N is fixed, and sprocket-chains O O connect the sprocket-wheels K K and sprocket-wheels N N, enabling the wagon A to be propelled by turning the crank-handles I I. By reducing the diameter of the rear sprocket-wheels O O and enlarging the diameter of the sprocket-wheels N N on the handle-bar H the speed can be increased, and vice versa. To the front of the front axle of the wagon A, on each side of the fifth-wheel, is rigidly attached an iron guide P, extending forward and upward through the bottom of the body of the wagon A, in which a suitable slot is cut for its easy working, said guide P extending to a point easily reached by the foot of the person sitting in the wagon A and furnished at its top with a suitable foot-rest Q. By pushing with the feet the foot-rests Q Q alternately the wagon A may be guided as desired.

Having thus described my invention, what I claim as new, and desire to secure by Letters Patent, is—

In combination with a four-wheeled wagon having two axles joined by a reach formed by the union of the hind hounds, after their meeting, in one piece, a front axle connected with the wagon by a king-bolt and fifth-wheel, an ordinary rectangular body, ordinary double seats and a step at the back to mount into the same, of two standards, rising, one on either side of said wagon-body, vertically from the front axle, a cross-bar supporting said standards and above and disconnected with the front axle of said wagon and rigidly secured to the bottom of the front spring of said wagon, braces in two parts connected by an interiorly right-and-left screw-threaded sleeve parallel to the body of said wagon extending from said standards to the rear axle of said wagon, a crank-shaft mounted in journal-boxes fixed on said standards, sprocket-wheels on the ends of said shaft, sprocket-wheels on the inner ends of the hubs of the rear wheels of said wagon, chains connecting the sprocket-wheels on each side of said body and guides secured to the front of the front axle of said wagon and extending outward and upward through slots in the floor of the body of said wagon and having foot-rests on the ends of said guides, substantially as shown and described.

In testimony whereof I hereto affix my signature in the presence of two witnesses.

FRANCIS XAVIER GOLATA.

Witnesses:
 NELLIE RYAN,
 ALBERT E. NUGENT.